United States Patent
Xiong et al.

(10) Patent No.: US 11,546,844 B2
(45) Date of Patent: Jan. 3, 2023

(54) POWER SUPPLY AND POWER SYSTEM

(71) Applicant: HUAWEI TECHNOLOGIES CO., LTD., Guangdong (CN)

(72) Inventors: Liqun Xiong, Shenzhen (CN); Jinli Feng, Dongguan (CN); Yingkun Luo, Dongguan (CN); Jinfeng Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 157 days.

(21) Appl. No.: 17/034,180

(22) Filed: Sep. 28, 2020

(65) Prior Publication Data
US 2021/0014783 A1 Jan. 14, 2021

Related U.S. Application Data

(63) Continuation of application No. PCT/CN2019/079956, filed on Mar. 27, 2019.

(30) Foreign Application Priority Data

Mar. 30, 2018 (CN) .......................... 201820449201.3

(51) Int. Cl.
*H02M 3/156* (2006.01)
*H04W 52/02* (2009.01)
(Continued)

(52) U.S. Cl.
CPC ........ *H04W 52/0206* (2013.01); *G05F 1/625* (2013.01); *H02M 1/007* (2021.05);
(Continued)

(58) Field of Classification Search
CPC . H04W 52/0206; H04W 76/10; H04W 88/08; G05F 1/625; H02M 1/007; H02M 3/156; H02M 7/02
(Continued)

(56) References Cited

U.S. PATENT DOCUMENTS 9,543,758 B1    1/2017  Manchanda et al.
2009/0296432 A1* 12/2009 Chapuis .................... H02J 1/08
                                                    363/65
(Continued)

FOREIGN PATENT DOCUMENTS

CN          203562823 U      4/2014
CN          104065281 A      9/2014
(Continued)

*Primary Examiner* — Ryan Jager
(74) *Attorney, Agent, or Firm* — Womble Bond Dickinson (US) LLP (57) ABSTRACT

This application discloses a power supply and a power system. A first power supply is configured to set an output voltage of the first power supply to a plurality of voltage values. A second power supply is configured to send a plurality of first parameters to the first power supply, where the first parameters are used to identify power efficiency of the second power supply. The first power supply is further configured to obtain a plurality of second parameters, which are used to identify power efficiency of the first power supply. The first power supply is further configured to determine, based on the plurality of first parameters and the plurality of second parameters, maximum power efficiency of the power system and a voltage value corresponding to the maximum power efficiency.

20 Claims, 5 Drawing Sheets

(51) Int. Cl.
  *H04W 76/10* (2018.01)
  *G05F 1/625* (2006.01)
  *H02M 1/00* (2006.01)
  *H04W 88/08* (2009.01)
(52) U.S. Cl.
  CPC ........... *H02M 3/156* (2013.01); *H04W 76/10* (2018.02); *H04W 88/08* (2013.01)
(58) Field of Classification Search
  USPC .......................................................... 307/52
  See application file for complete search history.

(56) References Cited

U.S. PATENT DOCUMENTS

| | | | | |
|---|---|---|---|---|
| 2010/0156176 A1* | 6/2010 | Kim | ........................ | H02J 1/00 307/31 |
| 2010/0165684 A1* | 7/2010 | Chen | ........................ | H02M 1/10 363/127 |
| 2010/0246220 A1* | 9/2010 | Irving | ................... | H02M 1/4225 363/78 |
| 2011/0038189 A1* | 2/2011 | Whittam | ................... | H02J 1/00 363/84 |
| 2012/0112720 A1* | 5/2012 | Remmert | ............... | H03K 17/14 323/283 |
| 2016/0073455 A1* | 3/2016 | Takacs | ................... | H05B 45/10 315/297 |

FOREIGN PATENT DOCUMENTS

| | | |
|---|---|---|
| CN | 105472786 A | 4/2016 |
| CN | 107181252 A | 9/2017 |
| CN | 208489801 U | 2/2019 |
| JP | 2017175888 A | 9/2017 |

\* cited by examiner

POWER SUPPLY AND POWER SYSTEM

CROSS-REFERENCE TO RELATED APPLICATIONS

This application is a continuation of International Application No. PCT/CN2019/079956, filed on Mar. 27, 2019. The International Application claims priority to Chinese Patent Application No. 201820449201.3, filed on Mar. 30, 2018. The disclosures of the aforementioned applications are hereby incorporated by reference in their entireties.

TECHNICAL FIELD

The utility model relates to the field of information technologies, and in particular, to a power supply and a power system.

BACKGROUND

In a communications system, a power system of a base station provides a power supply to the base station. Generally, the power system of the base station includes a primary power supply to convert a mains supply in an alternating current state into a direct current. The power system of the base station further includes a secondary power supply, configured to perform high-voltage to low-voltage direct current (DC-DC) conversion on the direct current output by the primary power supply.

When efficiency adjustment is performed on the power system of the base station, efficiency adjustment of the primary power supply and efficiency adjustment of the secondary power supply are independent of each other. Efficiency of the power system of the base station is a product of efficiency of the primary power supply and efficiency of the secondary power supply. However, when the efficiency of the primary power supply and the efficiency of the secondary power supply are both adjusted to be the highest, the power system of the base station cannot achieve optimal efficiency. Consequently, power efficiency of the power system of the base station is reduced.

Utility Model Content

Embodiments of this application disclose a power supply and a power system, to improve power efficiency of the power system.

According to a first aspect, an embodiment of this application provides a power system, where the power system includes a first power supply and a second power supply, an output end of the first power supply is electrically connected to an input end of the second power supply, and is used by the first power supply to supply power to the second power supply, the second power supply establishes a communication connection to the first power supply, where the first power supply is configured to set an output voltage of the first power supply to a plurality of voltage values; the second power supply is configured to send a plurality of first parameters to the first power supply, where the first parameters are used to identify power efficiency of the second power supply, the plurality of first parameters are in a one-to-one correspondence with the plurality of voltage values, and a first parameter corresponding to one voltage value is a first parameter that the second power supply has when the output voltage of the first power supply is the voltage value; the first power supply is further configured to obtain a plurality of second parameters, where the plurality of second parameters are in a one-to-one correspondence with the plurality of voltage values, the second parameters are used to identify power efficiency of the first power supply, and a second parameter corresponding to one voltage value is a second parameter that the first power supply has when the output voltage of the first power supply is the voltage value; and the first power supply is further configured to determine, based on the plurality of first parameters and the plurality of second parameters, maximum power efficiency of the power system and a voltage value corresponding to the maximum power efficiency. In the foregoing power system, the output voltage of the first power supply may be set to the plurality of voltage values, to determine a corresponding output voltage value that the first power supply has when the power efficiency of the power system is the maximum power efficiency, so that the power system works at relatively high power efficiency, thereby improving the power efficiency of the power system.

In an embodiment, the power system further includes a third power supply, where an output end of the second power supply is electrically connected to an input end of the third power supply, and is used by the second power supply to supply power to the third power supply, the third power supply establishes a communication connection to the first power supply, where the third power supply is configured to send a plurality of third parameters to the first power supply, where the third parameters are used to identify power efficiency of the third power supply, the plurality of third parameters are in a one-to-one correspondence with the plurality of voltage values, and a third parameter corresponding to one voltage value is a third parameter that the third power supply has when the output voltage of the first power supply is the voltage value; and the first power supply is specifically configured to determine, based on the plurality of second parameters and at least one of the plurality of first parameters and the plurality of third parameters, the maximum power efficiency of the power system and the voltage value corresponding to the maximum power efficiency.

In an embodiment, the first parameters include at least one of the following parameters: an output power of the second power supply, power efficiency of the second power supply, and an output voltage and an output current of the second power supply, and the third parameters include at least one of the following parameters: an output power of the third power supply, power efficiency of the third power supply, and an output voltage and an output current of the third power supply.

In an embodiment, the second parameters include at least one of the following parameters: an input power of the first power supply, power efficiency of the first power supply, and an input voltage and an input current of the first power supply.

In an embodiment, the first power supply is further configured to set the output voltage of the first power supply to the voltage value corresponding to the maximum power efficiency.

In one embodiment, the plurality of output voltage values may be obtained by selecting values in a preset voltage range based on a fixed step.

In one embodiment, the power system may include more or fewer power supplies than the three power supplies. These power supplies are connected in series.

According to a second aspect, an embodiment of this application provides a first power supply, where the first power supply is used for a power system, the power system includes the first power supply and a second power supply, an output end of the first power supply is electrically connected to an input end of the second power supply, and is used by the first power supply to supply power to the second power supply, the second power supply establishes a communication connection to the first power supply, and the first power supply includes a control module and a communications module, where the control module is configured to set an output voltage of the first power supply to a plurality of voltage values; the communications module is configured to receive a plurality of first parameters sent by the second power supply, where the first parameters are used to identify power efficiency of the second power supply, the plurality of first parameters are in a one-to-one correspondence with the plurality of voltage values, and a first parameter corresponding to one voltage value is a first parameter that the second power supply has when the output voltage of the first power supply is the voltage value; the control module is further configured to obtain a plurality of second parameters, where the plurality of second parameters are in a one-to-one correspondence with the plurality of voltage values, the second parameters are used to identify power efficiency of the first power supply, and a second parameter corresponding to one voltage value is a second parameter that the first power supply has when the output voltage of the first power supply is the voltage value; and the control module is further configured to determine, based on the plurality of first parameters and the plurality of second parameters, maximum power efficiency of the power system and a voltage value corresponding to the maximum power efficiency. The output voltage of the first power supply is set to the plurality of voltage values, to determine a corresponding output voltage value that the first power supply has when the power efficiency of the power system is the maximum power efficiency, so that the power system works at relatively high power efficiency, thereby improving the power efficiency of the power system.

In an embodiment, the power system further includes a third power supply, where an output end of the second power supply is electrically connected to an input end of the third power supply, and is used by the second power supply to supply power to the third power supply, the third power supply establishes a communication connection to the first power supply, where the communications module is further configured to receive a plurality of third parameters sent by the third power supply, where the third parameters are used to identify power efficiency of the third power supply, the plurality of third parameters are in a one-to-one correspondence with the plurality of voltage values, and a third parameter corresponding to one voltage value is a third parameter that the third power supply has when the output voltage of the first power supply is the voltage value; and the control module is specifically configured to determine, based on the plurality of second parameters and at least one of the plurality of first parameters and the plurality of third parameters, the maximum power efficiency of the power system and the voltage value corresponding to the maximum power efficiency.

In an embodiment, the first parameters include at least one of the following parameters: an output power of the second power supply, power efficiency of the second power supply, and an output voltage and an output current of the second power supply, and the third parameters include at least one of the following parameters: an output power of the third power supply, power efficiency of the third power supply, and an output voltage and an output current of the third power supply.

In an embodiment, the second parameters include at least one of the following parameters: an input power of the first power supply, power efficiency of the first power supply, and an input voltage and an input current of the first power supply.

In an embodiment, the control module is further configured to set the output voltage of the first power supply to the voltage value corresponding to the maximum power efficiency.

According to a third aspect, an embodiment of this application provides a second power supply, where the second power supply is used for a power system, the power system includes a first power supply and the second power supply, an input end of the second power supply is electrically connected to an output end of the first power supply, and is used by the second power supply to receive power supplied by the first power supply, the second power supply establishes a communication connection to the first power supply, the second power supply includes a communications module, where the communications module is configured to send a plurality of first parameters to the first power supply, the first parameters are used to identify power efficiency of the second power supply, the plurality of first parameters are in a one-to-one correspondence with a plurality of voltage values, and a first parameter corresponding to one voltage value is a first parameter that the second power supply has when an output voltage of the first power supply is the voltage value; and the plurality of voltage values are values that are of the output voltage of the first power supply and that are set by the first power supply, and the plurality of first parameters are used by the first power supply to determine, based on the plurality of first parameters and a plurality of second parameters, maximum power efficiency of the power system and a voltage value corresponding to the maximum power efficiency, where the plurality of second parameters are in a one-to-one correspondence with the plurality of voltage values, the second parameters are used to identify power efficiency of the first power supply, and a second parameter corresponding to one voltage value is a second parameter that the first power supply has when the output voltage of the first power supply is the voltage value. The output voltage of the first power supply is set to the plurality of voltage values, to determine a corresponding output voltage value that the first power supply has when the power efficiency of the power system is the maximum power efficiency, so that the power system works at relatively high power efficiency, thereby improving the power efficiency of the power system.

In an embodiment, the first parameters include at least one of the following parameters: an output power of the second power supply, power efficiency of the second power supply, and an output voltage and an output current of the second power supply.

According to a fourth aspect, an embodiment of this application provides a first power supply. The first power supply includes a module or a unit configured to implement the first power supply provided in any one of the second aspect or the embodiments of the second aspect.

According to a fifth aspect, an embodiment of this application provides a second power supply. The second power supply includes a module or a unit configured to implement the second power supply provided in any one of the third aspect or the embodiments of the third aspect.

According to a sixth aspect, an embodiment of this application provides a first power supply, including a processor, a memory, a communications interface, and a bus. The processor, the communications interface, and the memory communicate with each other by using the bus. The communications interface is configured to receive and send data. The memory is configured to store an instruction. The processor is configured to invoke an instruction in the memory, to implement the first power supply provided in any one of the second aspect or the embodiments of the second aspect.

According to a seventh aspect, an embodiment of this application provides a second power supply, including a processor, a memory, a communications interface, and a bus. The processor, the communications interface, and the memory communicate with each other by using the bus. The communications interface is configured to receive and send data. The memory is configured to store an instruction. The processor is configured to invoke an instruction in the memory, to implement the second power supply provided in any one of the third aspect or the embodiments of the third aspect.

According to an eighth aspect, an embodiment of this application provides a computer-readable storage medium. The storage medium includes an instruction, and when the instruction is run, a first power supply is enabled to perform a function of the first power supply according to any one of the second aspect or the embodiments of the second aspect.

According to a ninth aspect, an embodiment of this application provides a computer-readable storage medium. The storage medium includes an instruction, and when the instruction is run, a second power supply is enabled to perform a function of the second power supply according to any one of the third aspect or the embodiments of the third aspect.

According to a tenth aspect, an embodiment of this application provides a computer program. The computer program includes an instruction, and when the instruction is run, a first power supply is enabled to perform a function of the first power supply according to any one of the second aspect or the embodiments of the second aspect.

According to an eleventh aspect, an embodiment of this application provides a computer program. The computer program includes an instruction, and when the instruction is run, a second power supply is enabled to perform a function of the second power supply according to any one of the third aspect or the embodiments of the third aspect.

According to a twelfth aspect, an embodiment of this application provides a chip product, to implement the first power supply in any one of the second aspect or the embodiments of the second aspect.

According to a thirteenth aspect, an embodiment of this application provides a chip product, to implement the second power supply in any one of the third aspect or the embodiments of the third aspect.

The output voltage of the first power supply is set to the plurality of voltage values, to determine the corresponding output voltage value that the first power supply has when the power efficiency of the power system is the maximum power efficiency, so that the power system works at relatively high power efficiency, thereby improving the power efficiency of the power system.

BRIEF DESCRIPTION OF DRAWINGS

The following describes the accompanying drawings used in embodiments of this application.

DESCRIPTION OF EMBODIMENTS

Figure 1:
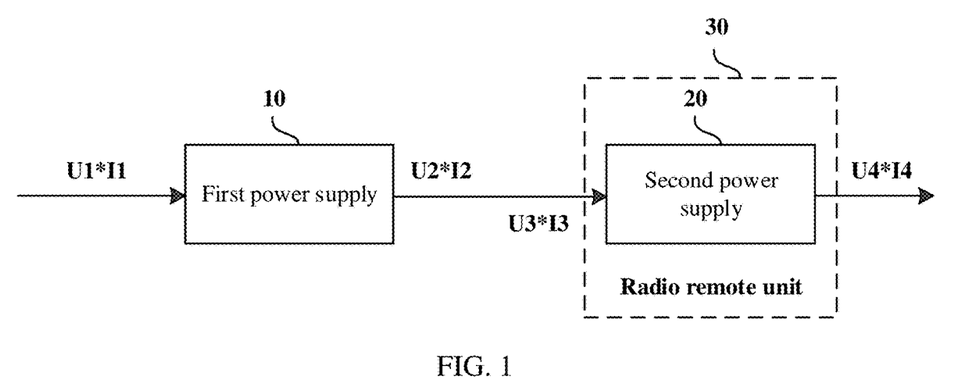
FIG. 1 is a schematic architectural diagram of a power system according to an embodiment of this application.

FIG. 1 is a schematic architectural diagram of a power system according to an embodiment of this application. The power system may be a power system of a base station configured to supply power to the base station. The power system may include a first power supply 10 and a second power supply 20. An output end of the first power supply 10 is electrically connected to an input end of the second power supply 20, and is used by the first power supply 10 to supply power to the second power supply 20.

When the power system is the power system of the base station, the first power supply 10 is configured to: perform alternating current-direct current (AC-DC) conversion, that is, receive an alternating current, and convert the alternating current into a direct current. The received alternating current may be a mains supply. An input voltage of the first power supply 10 is U1 and an input current is I1. An output direct current voltage of the first power supply 10 is U2 and an output current is I2. The output voltage U2 may be, for example, −48 V. The output direct current of the first power supply 10 may be used to supply power to the second power supply 20. As shown in FIG. 1, an input voltage of the second power supply 20 is U3, and an input current is I3. Because of a voltage drop of a cable, an input U3*I3 of the second power supply 20 may be slightly less than an output U2*I2 of the first power supply 10.

The second power supply 20 is configured to perform DC-DC conversion on a direct current to supply power to a power amplifier (PA) or a circuit board. Specifically, as shown in FIG. 1, the second power supply 20 is configured to: receive a direct current whose voltage value is U3, and convert the direct current into a direct current whose voltage is U4.

As shown in FIG. 1, in the power system of the base station, the second power supply 20 may be included in a radio remote unit (RRU) 30. An output U4*I4 of the second power supply 20 may supply power to the power amplifier. The output of the second power supply 20 may also supply power to the circuit board after another power supply performs the DC-DC conversion on the output of the second power supply 20.

Power efficiency η of a power supply is a ratio of an output power of the power supply to an input power of the power supply. Specifically, as shown in FIG. 1, power efficiency of the first power supply 10 is $$\eta 1 = \frac{U2*I2}{U1*I1}.$$

Power efficiency of the second power supply 20 is $$\eta 2 = \frac{U4*I4}{U3*I3}.$$

Power efficiency of the power system is $$\eta 3 = \frac{U4 * I4}{U1 * I1} \approx \eta 1 * \eta 2 * (U3 * I3 \approx U2 * I2).$$

After a design of the foregoing power system is completed, the power efficiency of the first power supply 10 is related to an output power of the first power supply 10. The power efficiency of the second power supply 20 is related to an output power of the second power supply 20. When the power efficiency of the first power supply 10 is maximum, the power efficiency of the second power supply 20 is generally not maximum. Consequently, the power efficiency of the power system is relatively low.

Based on the foregoing schematic architectural diagram of the power system described in FIG. 1, an embodiment of this application provides a power supply and a power system, to improve power efficiency of the power system.

Figure 2:
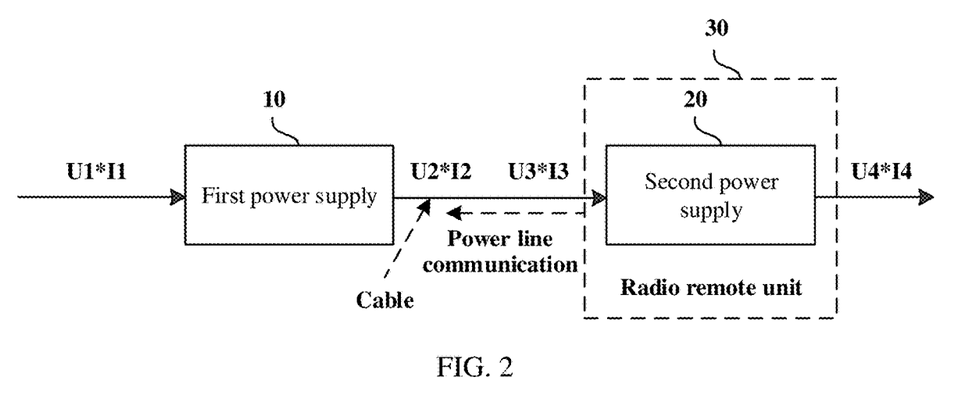
FIG. 2 is a schematic structural diagram of a power system according to an embodiment of this application.

FIG. 2 is a schematic structural diagram of a power system according to an embodiment of this application. As shown in FIG. 2, the power system may include a first power supply 10 and a second power supply 20. An output end of the first power supply 10 is electrically connected to an input end of the second power supply 20, and is used by the first power supply 10 to supply power to the second power supply 20.

The second power supply 20 establishes a communication connection to the first power supply 10. The first power supply 10 and the second power supply 20 may be electrically connected by using a cable, and the communication connection established between the second power supply 20 and the first power supply 10 may be power line communication (PLC). In addition, the communication connection established between the second power supply 20 and the first power supply 10 may alternatively be other wired communication or wireless communication. Specifically, the communication connection established between the second power supply 20 and the first power supply 10 may be, for example, a controller area network (CAN) connection, an RS485 interface connection, a WIFI connection, or a Bluetooth connection.

The first power supply 10 may be configured to set the output voltage U2 of the first power supply 10 to a plurality of voltage values. For example, U2 is sequentially $U2_a$, $U2_b$, $U2_c$ . . . . When the first power supply 10 sets the output voltage U2 of the first power supply 10 to the plurality of voltage values, power efficiency of the power system may be sequentially obtained. Table 1 shows a correspondence between the output voltage of the first power supply 10 and the power efficiency of the power system according to an embodiment of this application.

TABLE 1

Correspondence between the output voltage of the first power supply 10 and the power efficiency of the power system

| | | | | |
|---|---|---|---|---|
| Output voltage (U2) of the first power supply 10 | $U2_a$ | $U2_b$ | $U2_c$ | . . . |
| Power efficiency (η3) of the power system | $\eta 3_a$ | $\eta 3_b$ | $\eta 3_c$ | . . . |

As shown in Table 1, when the output voltage U2 of the first power supply 10 is $U2_a$, corresponding efficiency of the power system is $\eta 3_a$. Specifically, when the first power supply 10 sets the output voltage U2 of the first power supply 10 to $U2_a$, power efficiency of the first power supply 10 is $$\eta 1_a = \frac{U2_a * I2_a}{U1 * I1}.$$

The input voltage of the second power supply 20 is $U3_a$. The output voltage of the second power supply 20 is $U4_a$, and an output current is $I4_a$. Power efficiency of the second power supply 20 is $$\eta 2_a = \frac{U4_a * I4_a}{U3_a * I3_a}.$$

Efficiency of the power system is $$\eta 3_a = \frac{U4_a * I4_a}{U1 * I1} \approx \eta 1_a * \eta 2_a.$$

When the output voltage U2 of the first power supply 10 is sequentially $U2_b$, $U2c$ . . . , calculation of the efficiency of the power system is similar, and is not described herein again.

The second power supply 20 may send a plurality of first parameters of the second power supply to the first power supply 10. The first parameters are used to identify power efficiency of the second power supply 20. The plurality of first parameters are in a one-to-one correspondence with the plurality of voltage values ($U2_a$, $U2_b$, $U2_c$ . . . ). A first parameter corresponding to one voltage value is a first parameter that the second power supply has when the output voltage of the first power supply 10 is the voltage value.

The first power supply 10 may obtain a plurality of second parameters. The plurality of second parameters are in a one-to-one correspondence with the plurality of voltage values ($U2_a$, $U2_b$, $U2_c$ . . . ). The second parameters are used to identify power efficiency of the first power supply 10. A second parameter corresponding to one voltage value is a second parameter that the first power supply 10 has when the output voltage of the first power supply 10 is the voltage value.

The first power supply 10 may determine, based on the plurality of first parameters and the plurality of second parameters, maximum power efficiency of the power system and a voltage value that is of the output voltage of the first power supply 10 and that corresponds to the maximum power efficiency. Specifically, the first power supply 10 may determine, based on the plurality of first parameters and the plurality of second parameters, power efficiency of a power system corresponding to each of the plurality of voltage values ($U2_a$, $U2_b$, $U2_c$ . . . ), that is, obtain a plurality of pieces of power efficiency of the power system, where the plurality of pieces of power efficiency of the power system are in a one-to-one correspondence with the plurality of voltage values. Then, the first power supply 10 finds the maximum power efficiency in the plurality of pieces of power efficiency of the power system and the output voltage value that is of the first power supply 10 and that corresponds to the maximum power efficiency.

The first power supply 10 may set the output voltage of the first power supply 10 to the voltage value corresponding to the maximum power efficiency.

The output voltage of the first power supply 10 is set to the plurality of voltage values, to determine the corresponding output voltage value that the first power supply 10 has when the power efficiency of the power system is the maximum power efficiency, so that the power system works at relatively high power efficiency, thereby improving the power efficiency of the power system.

Specifically, the first parameters may include output power U4*I4 of the second power supply 20, power efficiency $$\eta 2 = \frac{U4 * I4}{U3 * I3}$$

of the second power supply 20, or an output voltage U4 and an output current I4 of the second power supply 20. For the foregoing three cases, that the power supply 10 sets the output voltage of the first power supply 10 to $U2_a$ is used as an example to describe a process in which the first power supply 10 determines the power efficiency of the power system. A case in which the output voltage of the first power supply 10 is another voltage value is similar. The following provides descriptions separately.

(1) When the first parameters include an output power $U4_a*I4_a$ of the second power supply 20, the second power supply 20 sends the output power $U4_a*I4_a$ of the second power supply 20 to the first power supply 10. The first power supply 10 may obtain an input power U1*I1 of the first power supply 10. The first power supply 10 calculates the power efficiency $$\eta 3_a = \frac{U4_a * I4_a}{U1 * I1}$$

of the power system based on the input power (U1*I1) of the first power supply 10 and the output power ($U4_a*I4_a$) of the second power supply 20.

(2) When the first parameters include the power efficiency $\eta 2_a$ of the second power supply 20, the second power supply 20 obtains the power efficiency $$\eta 2_a \left( \frac{U4_a * I4_a}{U3_a * I3_a} \right)$$

of the second power supply 20, and sends the power efficiency $\eta 2_a$ to the first power supply 10. The first power supply 10 may obtain the power efficiency $$\eta 1_a \left( \frac{U2_a * I2_a}{U1 * I1} \right)$$

of the first power supply 10. The first power supply 10 calculates the power efficiency $\eta 3_a = \eta 2_a * \eta 1_a$ of the power system based on the power efficiency $\eta 1_a$ of the first power supply 10 and the power efficiency $\eta 2_a$ of the second power supply 20.

(3) When the first parameters include the output voltage $U4_a$ and the output current $I4_a$ of the second power supply 20, the second power supply 20 sends the output voltage $U4_a$ and the output current $I4_a$ of the second power supply 20 to the first power supply 10. The first power supply 10 may obtain an input power U1*I1 of the first power supply 10. The first power supply 10 calculates the power efficiency $$\eta 3_a = \frac{U4_a * I4_a}{U1 * I1}$$

of the power system based on the input power U1*I1 of the first power supply 10 and the output power $U4_a$ and the output current $I4_a$ of the first power supply 10.

The plurality of second parameters obtained by the first power supply 10 may include at least one of the following parameters: the input power U1*I1 of the first power supply 10, the power efficiency $$\eta 1_a \left( \frac{U2_a * I2_a}{U1 * I1} \right)$$

of the first power supply 10, and the input voltage U1 and the input current I1 of the first power supply 10.

In one embodiment, the plurality of output voltage values of the first power supply 10 set by the first power supply 10 may be obtained by selecting values in a specific voltage range based on a fixed step. For example, if the voltage range is set to 48 V to 57 V based on a requirement of the power system, and the fixed step is 1 V, the plurality of output voltage values of the first power supply 10 set by the first power supply 10 are: 48 V, 49 V, 50 V . . . 57 V. The first power supply 10 may find, from the foregoing 10 voltage values, a corresponding voltage value when the power efficiency of the power system is maximum (the voltage value corresponding to the maximum power efficiency), and the first power supply 10 may set the output voltage of the first power supply to the voltage value corresponding to the maximum power efficiency. In this case, in the voltage range of 48 V to 57 V, the power efficiency of the power system may be the highest, thereby improving the power efficiency of the power system.

Specifically, Table 2 is an example of the output voltage value of the first power supply 10 and the efficiency of the power system according to an embodiment of this application.

TABLE 2

Example of the output voltage value of the first power supply 10 and the efficiency of the power system

| Output voltage U2 (V) | Load power (W) | Power efficiency of a first power supply | Power efficiency of a second power supply | Power efficiency of a power system |
|---|---|---|---|---|
| 48 | 400 | 92.23% | 92.06% | 84.91% |
| 49 | 400 | 93.83% | 92.11% | 86.42% |
| 50 | 400 | 91.80% | 92.01% | 84.47% |
| 51 | 400 | 92.99% | 91.91% | 85.47% |
| 52 | 400 | 91.39% | 91.59% | 83.71% |
| 53 | 400 | 92.38% | 91.25% | 84.30% |
| 54 | 400 | 90.86% | 90.88% | 82.57% |
| 55 | 400 | 92.26% | 90.47% | 83.46% |
| 56 | 400 | 90.35% | 90.10% | 81.41% |
| 57 | 400 | 92.34% | 89.80% | 82.92% |

As shown in Table 2, when load power is 400 W, and the output voltage value of the first power supply is sequentially 48 V, 49 V, 50 V . . . 57 V, corresponding power efficiency of the power system is different. The first device 10 may find a maximum power efficiency value 86.42% of the power system, and an output voltage value 49 V that is of the first power supply 10 and that corresponds to the maximum voltage efficiency value 86.42%. Then, the first device 10 may set the output voltage of the first device to 49 V.

It may be understood that a larger value or a smaller value may be selected for the voltage fixed step based on a requirement. This is not limited in this embodiment of this application.

Figure 3:
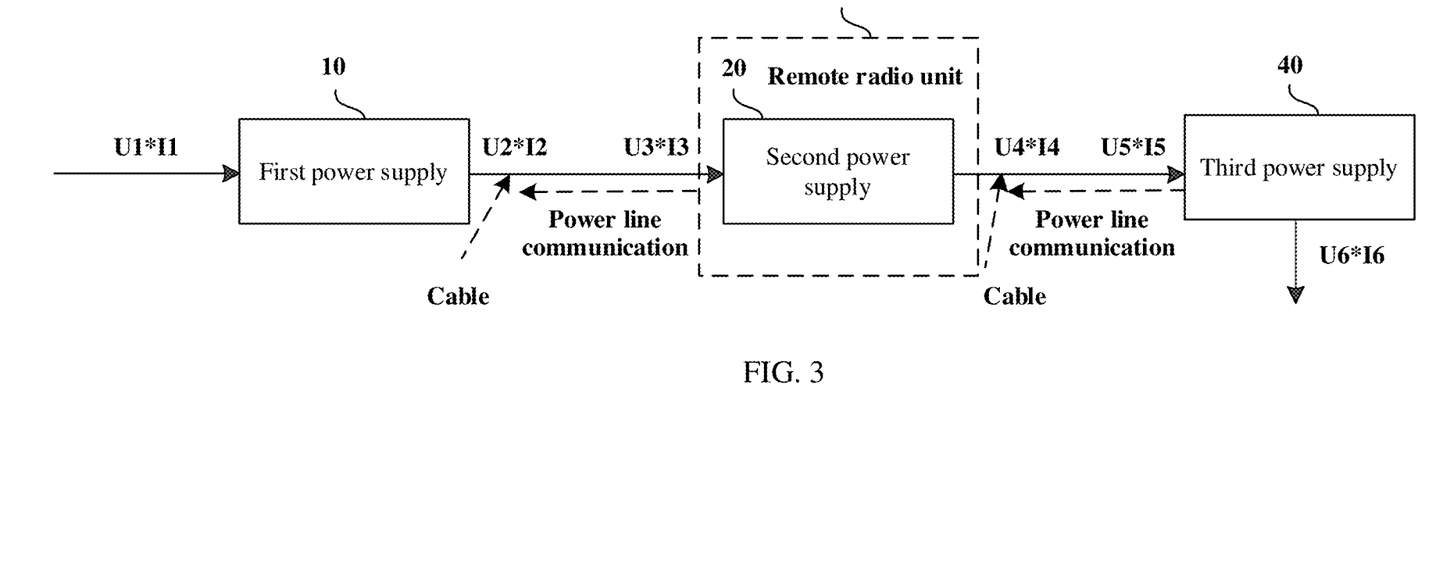
FIG. 3 is a schematic structural diagram of another power system according to an embodiment of this application.

In one embodiment, the power system may further include a third power supply 40. FIG. 3 is a schematic structural diagram of another power system according to an embodiment of this application. As shown in FIG. 3, an output end of a second power supply 20 is electrically connected to an input end of a third power supply 40, and is used by the second power supply 20 to supply power to the third power supply 40. The third power supply 40 establishes a communication connection to a first power supply 10.

The third power supply 40 is configured to send a plurality of third parameters to the first power supply 10. The third parameters are used to identify power efficiency of the third power supply 40. The plurality of third parameters are in a one-to-one correspondence with a plurality of output voltage values of the first power supply 10. A third parameter corresponding to one voltage value is a third parameter that the third power supply 40 has when an output voltage of the first power supply 10 is the voltage value.

The first power supply 10 is specifically configured to determine, based on a plurality of second parameters and at least one of a plurality of first parameters and the plurality of third parameters, maximum power efficiency of the power system and an output voltage value that is of the first power supply 10 and that corresponds to the maximum power efficiency.

The communication connection between the first power supply 10 and the third power supply 40 may also be power line communication, wired communication, or wireless communication. For details, refer to specific descriptions of the communication connection between the first power supply 10 and the second power supply 20, and details are not described herein again.

As shown in Table 1, when the power system includes the third power supply 40, and an output voltage U2 of the first power supply 10 is $U2_a$, corresponding efficiency of the power system is $\eta3_a$. Specifically, when the first power supply 10 sets the output voltage U2 of the first power supply 10 to $U2_a$, for the power system (including the first power supply 10, the second power supply 20, and the third power supply 40), power efficiency of the first power supply 10 is $$\eta1_a = \frac{U2_a * I2_a}{U1 * I1}.$$

An input voltage of the second power supply 20 is $U3_a$, and an input current is $I3_a$. An output voltage of the second power supply 20 is $U4_a$, an output current is I4a, and power efficiency of the second power supply 20 is $$\eta2_a = \frac{U4_a * I4_a}{U3_a * I3_a}.$$

An input voltage of the third power supply 40 is $U5_a$, and an input current is $I5_a$. An output voltage of the third power supply 40 is $U6_a$, an output current is $I6_a$, and power efficiency of the third power supply 40 is $$\eta4_a = \frac{U6_a * I6_a}{U5_a * I5_a}.$$

Efficiency of the power system is $$\eta3_a = \frac{U6_a * I6_a}{U1 * I1} \approx \eta1_a * \eta2_a * \eta4_a.$$

When the output voltage U2 of the first power supply 10 is sequentially $U2_b$, $U2_c$ . . . calculation of the efficiency of the power system is similar, and is not described herein again.

Specifically, the third parameters may include an output power U6*I6 of the third power supply 40, power efficiency $$\eta4 = \frac{U6 * I6}{U5 * I5}$$

of the third power supply 40, or an output voltage U6 and an output current I6 of the third power supply 40. For the foregoing three cases, that the power supply 10 sets the output voltage of the first power supply 10 to $U2_a$ is used as an example to describe a process in which the first power supply 10 determines the power efficiency of the power system. A case in which the output voltage of the first power supply 10 is another voltage value is similar. The following provides descriptions separately.

(1) When the first power supply 10 sets the output voltage of the first power supply 10 to $U2_a$, the third parameters may include an output power $U6_a*I6_a$ of the third power supply 40, and the third power supply 40 sends the output power $U6_a*I6_a$ of the third power supply 40 to the first power supply 10. The first power supply 10 may obtain an input power U1*I1 of the first power supply 10. The first power supply 10 calculates the power efficiency $$\eta3_a = \frac{U6_a * I6_a}{U1 * I1}$$

of the power system based on the input power (U1*I1) of the first power supply 10 and the output power ($U6_a*I6_a$) of the third power supply 40.

(2) When the third parameters include the power efficiency $\eta4_a$ of the third power supply 40, the third power supply 40 obtains the power efficiency $$\eta4_a = \left(\frac{U6_a * I6_a}{U5_a * I5_a}\right)$$

of the third power supply 40, and sends the power efficiency $\eta4_a$ to the first power supply 10. The first power supply 10 may obtain the power efficiency $$\eta1_a\left(\frac{U2_a * I2_a}{U1 * I1}\right)$$

of the first power supply 10. The first power supply 10 may obtain the power efficiency $$\eta 2_a \left( \frac{U4_a * I4_a}{U3_a * I3_a} \right)$$

of the second power supply 20, for example, may receive, by using a PLC connection, the $\eta 2_a$ sent by the second power supply. The first power supply 10 calculates the power efficiency $\eta 3_a \approx \eta 2_a * \eta 1_a * \eta 4_a$ of the power system based on the first power efficiency $\eta 1_a$ of the power supply 10, the power efficiency $\eta 2_a$ of the second power supply 20, and the power efficiency $\eta 4_a$ of the third power supply 40.

(3) When the third parameters include the output voltage $U6_a$ and the output current $I6_a$ of the third power supply 40, the third power supply 40 sends the output voltage $U6_a$ and the output current $I6_a$ of the third power supply 40 to the first power supply 10. The first power supply 10 may obtain an input power U1*I1 of the first power supply 10. The first power supply 10 calculates the power efficiency $$\eta 3_a = \frac{U6_a * I6_a}{U1 * I1}$$

of the power system based on the input power U1*I1 of the first power supply 10, and the output voltage $U6_a$ and the output current $I6_a$ of the third power supply 40.

When the power system is a power system of a base station, the third power supply 40 may be configured to supply power to a circuit board. The output power of the third power supply 40 may be replaced with a set-top output power. The set-top output power is a radiant power of an antenna of the base station.

It may be understood that, when the power system is a power system other than the power system of the base station, the power system may include more or fewer power supplies than the three power supplies. These power supplies are connected in series. The first power supply may set a plurality of output voltage values, to obtain corresponding parameters of other power supplies connected in series, and select the corresponding output voltage value that the first supply has when the power efficiency of the entire power system is maximum, thereby improving the power efficiency of the power system. A quantity of power supplies included in the power system is not limited in this embodiment of this application.

In one embodiment, in the power system, the second power supply 20 or the third power supply 40 may calculate power efficiency that is of the power system and that corresponds to the plurality of output voltage values, and determine the maximum power efficiency of the power system and the output voltage value that is of the first power supply 10 and that corresponds to the maximum power efficiency. Specifically, the first power supply 10 may send the plurality of second parameters (including at least one of the following: the input power U1*I1 of the first power supply 10, the power efficiency $\eta 1$ of the first power supply 10, and the input voltage U1 and the input current I1 of the first power supply 10) to the second power supply 20. The second power supply 20 obtains the plurality of first parameters (including at least one of the following: the output power U4*I4 of the second power supply 20, the power efficiency $$\eta 2 = \frac{U4 * I4}{U3 * I3}$$

of the second power supply 20, and an output voltage U4 and an output current I4 of the second power supply 20). The second power supply 20 may determine, based on the plurality of first parameters and the plurality of second parameters, the maximum power efficiency of the power system and the voltage value that is of the output voltage of the first power supply 10 and that corresponds to the maximum power efficiency. The second power supply 20 may send, to the first power supply 10, the maximum power efficiency of the power system and the voltage value that is of the output voltage of the first power supply 10 and that corresponds to the maximum power efficiency. After receiving the maximum power efficiency of the power system and the voltage value that is of the output voltage of the first power supply 10 and that corresponds to the maximum power efficiency, the first power supply 10 sets the output voltage of the first power supply 10 to the output voltage value corresponding to the maximum power efficiency.

When the output power is fixed, the power efficiency of the power system in different output voltages of the first power supply 10 is calculated. When the power efficiency is maximum, the corresponding output voltage value of the first power supply 10 is selected, and the output voltage of the first power supply 10 is set to the output voltage value corresponding to the maximum power efficiency, thereby improving the power efficiency of the power system.

Figure 4:
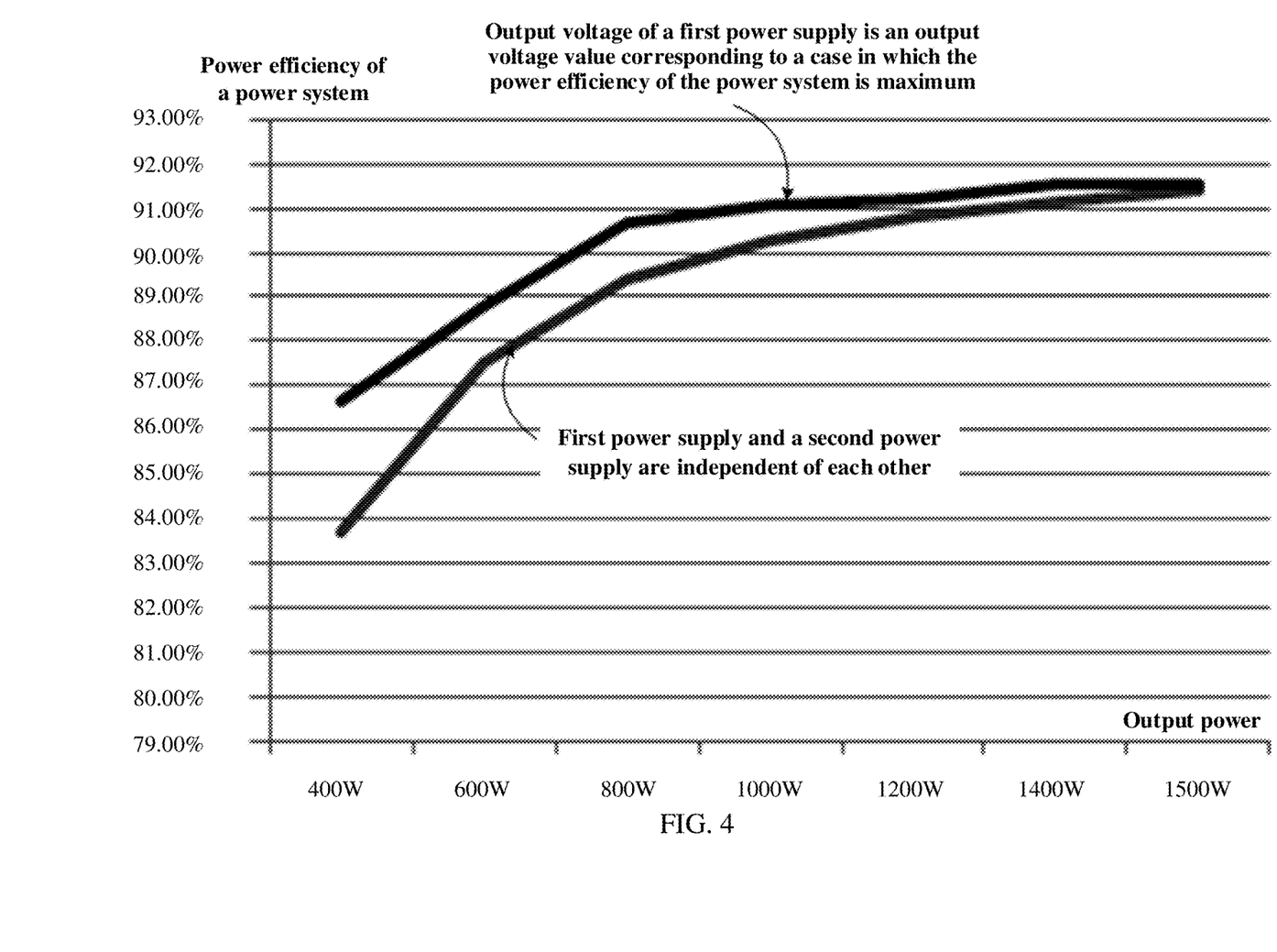
FIG. 4 is a test result of power efficiency of a power system according to an embodiment of this application.

FIG. 4 is a test result of power efficiency of a power system according to an embodiment of this application. As shown in FIG. 4, when the power system described in FIG. 2 or FIG. 3 is used to set an output voltage of a first power supply to an output voltage value corresponding to a case in which the power efficiency of the power system is maximum, the power efficiency of the power system in an identical output power can be improved.

Figure 5:
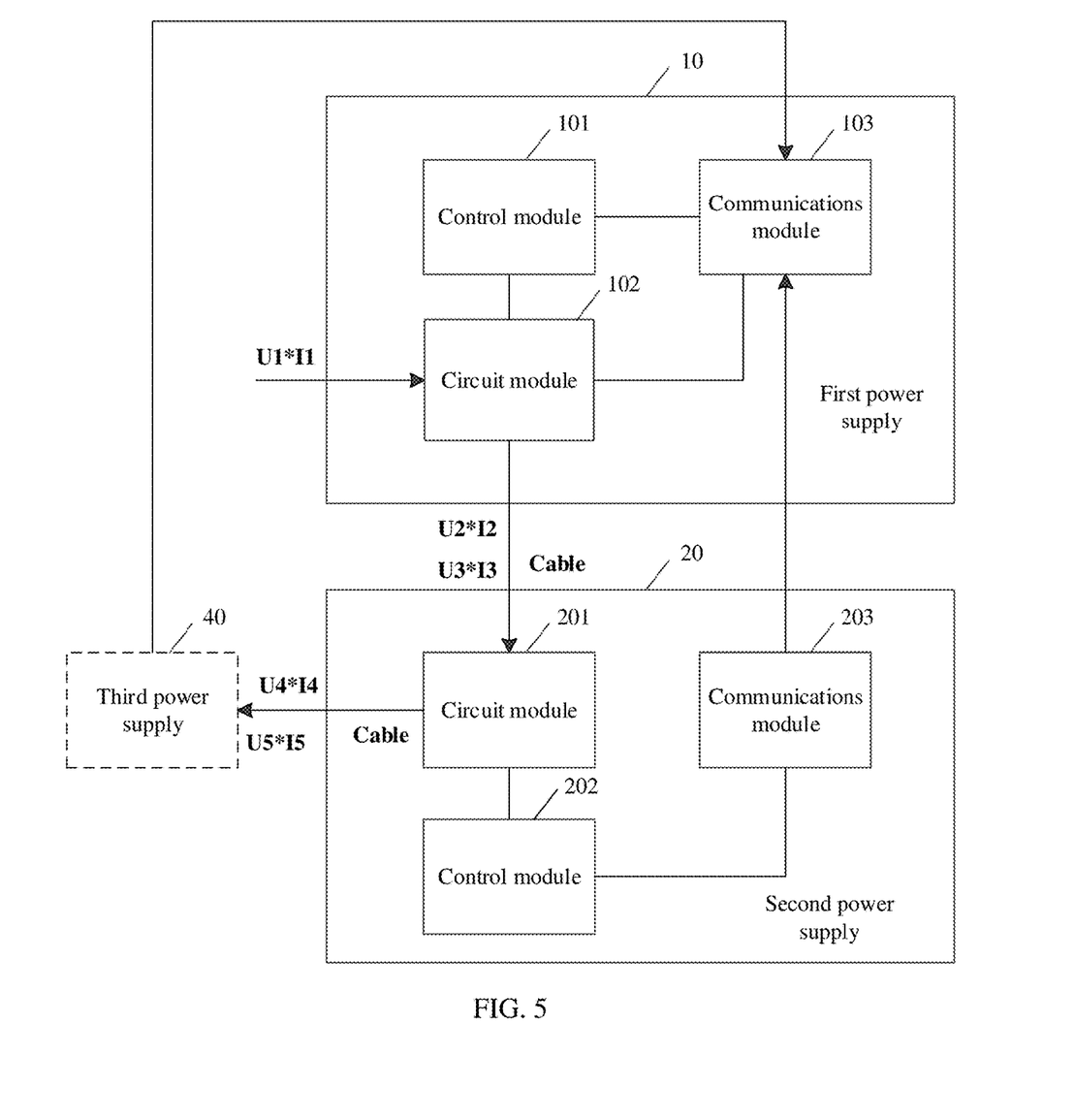
FIG. 5 is a schematic structural diagram of a first power supply and a second power supply according to an embodiment of this application.

FIG. 5 is a schematic structural diagram of a first power supply and a second power supply according to an embodiment of this application. A first power supply 10 and a second power supply 20 are used in the power system described in FIG. 2 or FIG. 3. As shown in FIG. 5, the first power supply 10 includes a control module 101, a circuit module 102, and a communications module 103.

The circuit module 102 is configured to: receive an input power U1*I1, and convert the input power U1*I1 to an output power U2*I2 by using a circuit.

The control module 101 is configured to set an output voltage U2 of the first power supply to a plurality of voltage values.

The communications module 103 is configured to receive a plurality of first parameters sent by the second power supply 20. The first parameters are used to identify power efficiency of the second power supply 20. The plurality of first parameters are in a one-to-one correspondence with the plurality of voltage values. A first parameter corresponding to one voltage value is a first parameter that the second power supply 20 has when the output voltage of the first power supply is the voltage value.

The control module 101 is further configured to obtain a plurality of second parameters. The plurality of second parameters are in a one-to-one correspondence with the plurality of voltage values. The second parameters are used to identify power efficiency of the first power supply 10. A second parameter corresponding to one voltage value is a second parameter that the first power supply 10 has when the output voltage of the first power supply is the voltage value.

The control module 101 is further configured to determine, based on the plurality of first parameters and the plurality of second parameters, maximum power efficiency of the power system and a voltage value corresponding to the maximum power efficiency.

In one embodiment, the power system may further include a third power supply 40. An output end of the second power supply 20 is electrically connected to an input end of the third power supply 40, and is used by the second power supply 20 to supply power to the third power supply 40. The third power supply 40 establishes a communication connection to the first power supply 10.

The communications module 103 is further configured to receive a plurality of third parameters sent by the third power supply 40. The third parameters are used to identify power efficiency of the third power supply. The plurality of third parameters are in a one-to-one correspondence with the plurality of voltage values. A third parameter corresponding to one voltage value is a third parameter that the third power supply 40 has when the output voltage of the first power supply is the voltage value.

The control module 101 is specifically configured to determine, based on the plurality of second parameters and at least one of the plurality of first parameters and the plurality of third parameters, the maximum power efficiency of the power system and the voltage value corresponding to the maximum power efficiency.

In one embodiment, the first parameters include at least one of the following parameters: an output power of the second power supply, power efficiency of the second power supply, and an output voltage and an output current of the second power supply.

The third parameters include at least one of the following parameters: an output power of the third power supply, power efficiency of the third power supply, and an output voltage and an output current of the third power supply.

In one embodiment, the second parameters include at least one of the following parameters: an input power of the first power supply, power efficiency of the first power supply, and an input voltage and an input current of the first power supply.

In one embodiment, the control module 101 is further configured to set the output voltage U1 of the first power supply 10 to the voltage value corresponding to the maximum power efficiency.

As shown in FIG. 5, the second power supply 40 includes a circuit module 201, a control module 202, and a communications module 203.

The circuit module 201 is configured to: receive an output power U3*I3 of the first power supply, and convert the output power U3*I3 to an output power U4*I4 by using a circuit.

The control module 202 is configured to instruct the communications module 203 to send the plurality of first parameters to the first power supply 10. The first parameters are used to identify the power efficiency of the second power supply 20. The plurality of first parameters are in the one-to-one correspondence with the plurality of voltage values. A first parameter corresponding to one voltage value is the first parameter that the second power supply has when the output voltage of the first power supply is the voltage value.

The plurality of voltage values are values that are of the output voltage of the first power supply 10 and that are set by the first power supply 10. The plurality of first parameters are used by the first power supply 10 to determine, based on the plurality of first parameters and the plurality of second parameters, the maximum power efficiency of the power system and the voltage value corresponding to the maximum power efficiency. The plurality of second parameters are in the one-to-one correspondence with the plurality of voltage values. The second parameters are used to identify the power efficiency of the first power supply 10. A second parameter corresponding to one voltage value is the second parameter that the first power supply 10 has when the output voltage of the first power supply is the voltage value.

In one embodiment, the first parameters include at least one of the following parameters: the output power of the second power supply 20, the power efficiency of the second power supply 20, and the output voltage and the output current of the second power supply 20.

The first power supply 10 and the second power supply 20 may be connected by using a cable.

In this embodiment, for functions of the modules, refer to corresponding descriptions of the power system embodiment shown in FIG. 2 or FIG. 3, and details are not described herein again.

Figure 6:
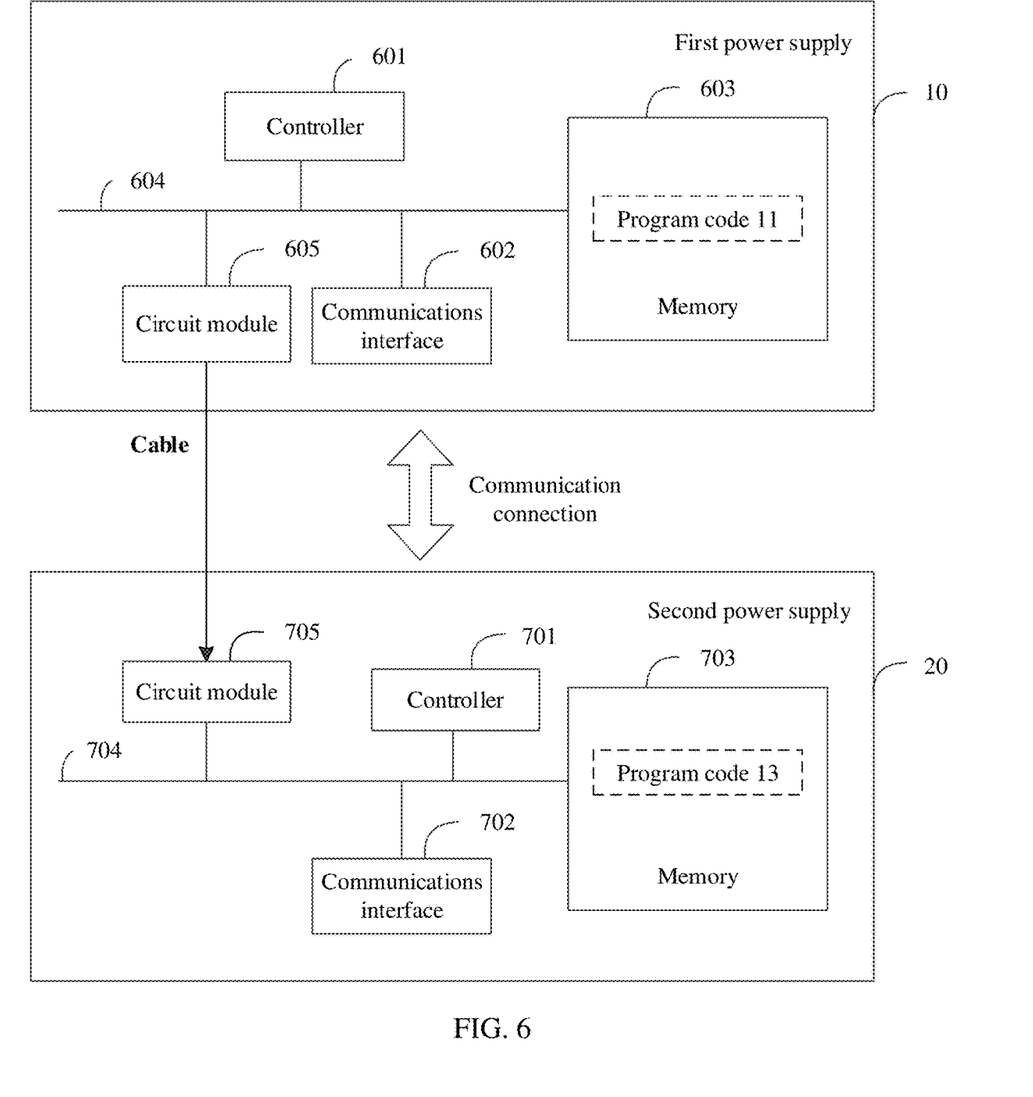
FIG. 6 is a schematic structural diagram of another first power supply and another second power supply according to an embodiment of this application.

FIG. 6 is a schematic structural diagram of another first power supply and another second power supply according to an embodiment of this application. A first power supply 10 and a second power supply 20 are used in the power system described in FIG. 2 or FIG. 3. As shown in FIG. 6, the first power supply 10 is connected to the second power supply 20 by using a cable, and is used by the first power supply 10 to supply power to the second power supply 20.

As shown in FIG. 6, the first power supply 10 provided in this embodiment of this application includes one or more controllers 601, a communications interface 602, a memory 603, and a circuit module 605. The controller 601, the communications interface 602, the memory 603, and the circuit module 605 may be connected by using a bus or in another manner. In this embodiment of this application, an example in which the controller 601, the communications interface 602, the memory 603, and the circuit module 605 are connected by using a bus 604 is used.

The controller 601 may include one or more general-purpose controllers, including a central controller (CPU). The controller 601 may be configured to run a related program in program code 11.

The communications interface 602 may be a wired interface (such as an Ethernet interface) or a wireless interface (such as a cellular network interface or a wireless local area network interface), and be configured to communicate with another node. In this embodiment of this application, the communications interface may alternatively be a communications interface for power line communication.

The memory 603 may include a volatile memory, such as a random access memory (RAM). The memory may alternatively include a nonvolatile memory, such as a read-only memory (ROM), a flash memory, a hard disk drive (HDD) or a solid-state drive (SSD). The memory 603 may alternatively include a combination of the foregoing types of memories. The memory 603 may be configured to store a group of the program code 11, so that the controller 601 invokes the program code 11 stored in the memory 603, to implement a function of the first power supply 10 in this embodiment of this application.

It should be noted that the first power supply 10 shown in FIG. 6 is merely one example embodiment of this application. In other embodiments, the first power supply 10 may further include more or fewer components. This is not limited herein.

As shown in FIG. 6, the second power supply 20 provided in this embodiment of this application includes one or more controllers 701, a communications interface 702, a memory 703, and a circuit module 705. The controller 701, the communications interface 702, the memory 703, and the circuit module 705 may be connected by using a bus or in another manner. In this embodiment of this application, an example in which the controller 701, the communications interface 702, the memory 703, and the circuit module 705 are connected by using a bus 704 is used.

The controller 701 may include one or more general-purpose controllers, such as a central controller (CPU). The controller 701 may be configured to run a related program in program code 13.

The communications interface 702 may be the wired interface (such as the Ethernet interface) or the wireless interface (such as the cellular network interface or the wireless local area network interface), and be configured to communicate with another node. In this embodiment of this application, the communications interface may alternatively be the communications interface for the power line communication.

The memory 703 may include a volatile memory, such as the random access memory (RAM). The memory may alternatively include a nonvolatile memory, such as the read-only memory (ROM), the flash memory (Flash Memory), the hard disk drive (HDD) or the solid-state drive (SSD). The memory 703 may alternatively include a combination of the foregoing types of memories. The memory 703 may be configured to store a group of the program code 13, so that the controller 701 invokes the program code 13 stored in the memory 703, to implement a function of the second power supply 20 provided in this embodiment of this application.

It should be noted that the second power supply 20 shown in FIG. 6 is merely one example embodiment of this application. In other embodiments, the first power supply 20 may further include more or fewer components. This is not limited herein.

It may be understood that, in this application, technical terms and technical solutions between different embodiments may be mutually referenced and mutually cited based on logic of the embodiments, and the embodiments to which the technical terms and the technical solutions are applicable are not limited in this application. The technical solutions in different embodiments are combined with each other, and a new embodiment may further be formed.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the processes of the methods in the embodiments may be implemented by a computer program instructing related hardware. The program may be stored in a computer-readable storage medium. When the program is run, processes of the method embodiments may be included. The foregoing storage medium includes: media that can store program code, such as a ROM, a random access memory RAM, a magnetic disk, and an optical disc.

What is claimed is:

1. A power system, comprising:
a first power supply and a second power supply, wherein an output end of the first power supply is electrically connected to an input end of the second power supply, and is used by the first power supply to supply power to the second power supply, the second power supply establishes a communication connection to the first power supply, wherein
the first power supply is configured to set an output voltage of the first power supply to a plurality of voltage values;
after, and in response to, receiving the plurality of voltage values from the first power supply, the second power supply is configured to send a plurality of first parameters to the first power supply that are used to identify power efficiency of the second power supply, wherein each of the plurality of first parameters are in a one-to-one correspondence with each of the plurality of voltage values, and a first parameter corresponding to a first voltage value of the plurality of voltage values is a first parameter that the second power supply has when the output voltage of the first power supply is the first voltage value;
after, and in response to, setting the plurality of voltage values, the first power supply is further configured to obtain a plurality of second parameters that are in a one-to-one correspondence with the plurality of voltage values, wherein the second parameters are used to identify power efficiency of the first power supply, and a second parameter corresponding to a second voltage value of the plurality of voltage values is a second parameter that the first power supply has when the output voltage of the first power supply is the second voltage value; and
the first power supply is further configured to determine, based on the plurality of first parameters and the plurality of second parameters, maximum power efficiency of the power system and a voltage value corresponding to the maximum power efficiency.

2. The system according to claim 1, further comprising a third power supply, wherein an output end of the second power supply is electrically connected to an input end of the third power supply, and is used by the second power supply to supply power to the third power supply, the third power supply establishes a communication connection to the first power supply, wherein the third power supply is configured to send a plurality of third parameters to the first power supply that are used to identify power efficiency of the third power supply, wherein the plurality of third parameters are in a one-to-one correspondence with the plurality of voltage values, and a third parameter corresponding to a third voltage value is a third parameter that the third power supply has when the output voltage of the first power supply is the third voltage value; and the first power supply is configured to determine, based on the plurality of second parameters and at least one of the plurality of first parameters and the plurality of third parameters, the maximum power efficiency of the power system and the voltage value corresponding to the maximum power efficiency.

3. The system according to claim 2, wherein the first parameters comprise at least one of the following parameters: an output power of the second power supply, power efficiency of the second power supply, and an output voltage or an output current of the second power supply; and the third parameters comprise at least one of the following parameters: an output power of the third power supply, power efficiency of the third power supply, or an output voltage and an output current of the third power supply.

4. The system according to claim 1, wherein the second parameters comprise at least one of the following parameters: an input power of the first power supply, power efficiency of the first power supply, or an input voltage and an input current of the first power supply.

5. The system according to claim 1, wherein the first power supply is further configured to set the output voltage of the first power supply to the voltage value corresponding to the maximum power efficiency.

6. The system according to claim 1, wherein the second power supply is configured to send the plurality of first parameters to the first power supply using a power line communication over the electrical connection between the first power supply and the second power supply.

7. The system according to claim 1, wherein the plurality of voltage values set by the first power supply are obtained by selecting values in a voltage range based on a fixed step.

8. The system according to claim 1, wherein the voltage value corresponding to the maximum power efficiency is selected from among the plurality of voltage values.

9. A first power supply, comprising:
a control module configured to set an output voltage of the first power supply to a plurality of voltage values;
a communications module configured to receive a plurality of first parameters sent by a second power supply after, and in response to, receiving the plurality of voltage values from the first power supply, wherein the first and second power supplies are part of a power system, wherein an output end of the first power supply is electrically connected to an input end of the second power supply, and is used by the first power supply to supply power to the second power supply, the second power supply establishes a communication connection to the first power supply,
wherein each of the first parameters are used to identify power efficiency of the second power supply that are in a one-to-one correspondence with each of the plurality of voltage values, and a first parameter corresponding to a first voltage value of the plurality of voltage values is a first parameter that the second power supply has when the output voltage of the first power supply is the first voltage value;

the control module is further configured to obtain a plurality of second parameters after, and in response to, setting the output voltage of the first power supply to the plurality of voltage values, wherein each of the plurality of second parameters are in a one-to-one correspondence with each of the plurality of voltage values, wherein the second parameters are used to identify power efficiency of the first power supply, and a second parameter corresponding to a second voltage value of the plurality of voltage values is a second parameter that the first power supply has when the output voltage of the first power supply is the second voltage value; and the control module is further configured to determine, based on the plurality of first parameters and the plurality of second parameters, maximum power efficiency of the power system and a voltage value corresponding to the maximum power efficiency.

10. The first power supply according to claim 9, wherein the power system further comprises a third power supply, wherein an output end of the second power supply is electrically connected to an input end of the third power supply, and is used by the second power supply to supply power to the third power supply, the third power supply establishes a communication connection to the first power supply, wherein the communications module is further configured to receive a plurality of third parameters sent by the third power supply, wherein the third parameters are used to identify power efficiency of the third power supply that are in a one-to-one correspondence with the plurality of voltage values, and a third parameter corresponding to a third voltage value is a third parameter that the third power supply has when the output voltage of the first power supply is the third voltage value; and the control module is configured to determine, based on the plurality of second parameters and at least one of the plurality of first parameters and the plurality of third parameters, the maximum power efficiency of the power system and the voltage value corresponding to the maximum power efficiency.

11. The first power supply according to claim 10, wherein the first parameters comprise at least one of the following parameters: an output power of the second power supply, power efficiency of the second power supply, or an output voltage and an output current of the second power supply; and the third parameters comprise at least one of the following parameters: an output power of the third power supply, power efficiency of the third power supply, or an output voltage and an output current of the third power supply.

12. The first power supply according to claim 9, wherein the second parameters comprise at least one of the following parameters: an input power of the first power supply, power efficiency of the first power supply, or an input voltage and an input current of the first power supply.

13. The first power supply according to claim 9, wherein the control module is further configured to set the output voltage of the first power supply to the voltage value corresponding to the maximum power efficiency.

14. The first power supply according to claim 9, wherein the first power supply is configured to receive the plurality of first parameters from the second power supply using a power line communication over the electrical connection between the first power supply and the second power supply.

15. The first power supply according to claim 9, wherein the plurality of voltage values set by the first power supply comprise values in a voltage range based on a fixed step.

16. The first power supply according to claim 9, wherein the voltage value corresponding to the maximum power efficiency is selected from among the plurality of voltage values.

17. A second power supply, comprising:
a communications module configured to send a plurality of first parameters to a first power supply after, and in response to, receiving a plurality of voltage values from the first power supply, wherein the first and second power supplies are a part of a power system, wherein an input end of the second power supply is electrically connected to an output end of the first power supply, and is used by the second power supply to receive power supplied by the first power supply, the second power supply establishes a communication connection to the first power supply,
wherein the first parameters are used to identify power efficiency of the second power supply, each of the plurality of first parameters are in a one-to-one correspondence with each of the plurality of voltage values, and a first parameter corresponding to a first voltage value of the plurality of voltage values is a first parameter that the second power supply has when an output voltage of the first power supply is the first voltage value; and
wherein the plurality of first parameters are used by the first power supply to determine, based on the plurality of first parameters and a plurality of second parameters, maximum power efficiency of the power system and a voltage value corresponding to the maximum power efficiency, wherein the plurality of second parameters are in a one-to-one correspondence with the plurality of voltage values, the second parameters are used to identify power efficiency of the first power supply, and a second parameter corresponding to a second voltage value of the plurality of voltage values is a second parameter that the first power supply has when the output voltage of the first power supply is the second voltage value.

18. The second power supply according to claim 17, wherein the first parameters comprise at least one of the following parameters: an output power of the second power supply, power efficiency of the second power supply, or an output voltage and an output current of the second power supply.

19. The second power supply according to claim 17, wherein the plurality of voltage values received from the first power supply comprise values in a voltage range based on a fixed step.

20. The second power supply according to claim 17, wherein the voltage value corresponding to the maximum power efficiency is one of the plurality of voltage values.

* * * * *